(12) United States Patent
Kiser et al.

(10) Patent No.: US 12,096,139 B2
(45) Date of Patent: *Sep. 17, 2024

(54) SYSTEMS AND METHODS FOR HDR VIDEO CAPTURE WITH A MOBILE DEVICE

(71) Applicant: Contrast, Inc., Albuquerque, NM (US)

(72) Inventors: Willie C. Kiser, Albuquerque, NM (US); Nora Tocci, Albuquerque, NM (US); Michael D. Tocci, Albuquerque, NM (US)

(73) Assignee: Contrast, Inc., Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/137,563

(22) Filed: Apr. 21, 2023

(65) Prior Publication Data

US 2023/0262352 A1    Aug. 17, 2023

Related U.S. Application Data

(63) Continuation of application No. 17/076,971, filed on Oct. 22, 2020, now Pat. No. 11,637,974, which is a
(Continued)

(51) Int. Cl.
*H04N 25/57* (2023.01)
*G02B 27/10* (2006.01)
(Continued)

(52) U.S. Cl.
CPC .......... *H04N 25/57* (2023.01); *G02B 27/106* (2013.01); *G02B 27/1066* (2013.01); *G02B 27/108* (2013.01); *G02B 27/145* (2013.01);

*H04N 9/646* (2013.01); *H04N 9/76* (2013.01); *H04N 23/13* (2023.01); *H04N 23/45* (2023.01);
(Continued)

(58) Field of Classification Search
CPC .......... H04N 25/57; H04N 9/646; H04N 9/76; H04N 23/13; H04N 23/45; H04N 23/54; H04N 23/55; H04N 23/57; H04N 23/741; G02B 27/106; G02B 27/1066; G02B 27/108; G02B 27/145

See application file for complete search history.

(56) References Cited

U.S. PATENT DOCUMENTS

| 5,734,507 A | * | 3/1998 | Harvey | ............... G02B 27/106 396/452 |
| 7,535,647 B1 | * | 5/2009 | Otten, III | ........... G02B 27/1006 359/629 |

(Continued)

*Primary Examiner* — Timothy R Newlin
(74) *Attorney, Agent, or Firm* — Withers Bergman LLP; Thomas C. Meyers

(57) ABSTRACT

The invention is relates to systems and methods for high dynamic range (HDR) image capture and video processing in mobile devices. Aspects of the invention include a mobile device, such as a smartphone or digital mobile camera, including at least two image sensors fixed in a co-planar arrangement to a substrate and an optical splitting system configured to reflect at least about 90% of incident light received through an aperture of the mobile device onto the co-planar image sensors, to thereby capture a HDR image. In some embodiments, greater than about 95% of the incident light received through the aperture of the device is reflected onto the image sensors.

16 Claims, 5 Drawing Sheets

Related U.S. Application Data continuation of application No. 16/379,318, filed on Apr. 9, 2019, now Pat. No. 10,819,925, which is a continuation of application No. 15/178,451, filed on Jun. 9, 2016, now Pat. No. 10,264,196, which is a continuation-in-part of application No. 15/169,006, filed on May 31, 2016, now Pat. No. 10,257,393, said application No. 15/178,451 is a continuation-in-part of application No. 15/169,012, filed on May 31, 2016, now Pat. No. 10,257,394.

(60) Provisional application No. 62/294,820, filed on Feb. 12, 2016.

(51) Int. Cl.
*G02B 27/14* (2006.01)
*H04N 9/64* (2023.01)
*H04N 9/76* (2006.01)
*H04N 23/13* (2023.01)
*H04N 23/45* (2023.01)
*H04N 23/54* (2023.01)
*H04N 23/55* (2023.01)
*H04N 23/57* (2023.01)
*H04N 23/741* (2023.01)
*H04N 23/50* (2023.01)

(52) U.S. Cl.
CPC ............. *H04N 23/54* (2023.01); *H04N 23/55* (2023.01); *H04N 23/57* (2023.01); *H04N 23/741* (2023.01); *H04N 23/50* (2023.01)

(56) References Cited

U.S. PATENT DOCUMENTS

| | | | |
|---|---|---|---|
| 7,623,781 B1* | 11/2009 | Sassa | G03B 35/10 348/36 |
| 8,323,047 B2* | 12/2012 | Reusche | H01R 13/5219 411/417 |
| 9,998,692 B1* | 6/2018 | Griffiths | G02B 27/1066 |
| 2004/0156134 A1* | 8/2004 | Furuki | G02B 5/04 359/883 |
| 2007/0182844 A1* | 8/2007 | Allman | G02B 5/04 348/345 |
| 2008/0068721 A1* | 3/2008 | Murnan | G03F 7/70383 359/629 |
| 2010/0201799 A1* | 8/2010 | Mohrholz | A61B 3/135 348/78 |
| 2012/0193520 A1* | 8/2012 | Bewersdorf | G02B 19/0057 250/578.1 |
| 2013/0258044 A1* | 10/2013 | Betts-Lacroix | H04N 23/45 348/E5.09 |
| 2014/0204195 A1* | 7/2014 | Katashiba | G02B 21/04 359/629 |
| 2014/0300795 A1* | 10/2014 | Bilcu | H04N 23/951 348/335 |
| 2015/0249105 A1* | 9/2015 | Skeete | H01L 27/14634 257/434 |
| 2017/0039716 A1* | 2/2017 | Morris | G01N 21/3504 |
| 2019/0130630 A1* | 5/2019 | Ackerson | H04N 13/111 |

* cited by examiner

SYSTEMS AND METHODS FOR HDR VIDEO CAPTURE WITH A MOBILE DEVICE

FIELD OF THE INVENTION

The present invention generally relates to image capture and processing, and, more particularly, to systems and methods for high dynamic range (HDR) image capture and video processing in mobile devices.

BACKGROUND

The human visual system is capable of identifying and processing visual features with a high degree of dynamic range. Dynamic range generally refers to the range of light intensities from the darkest shadows to the brightest highlights. For example, real-world scenes with contrast ratios of 1,000,000:1 or greater can be accurately processed by the human visual cortex. The human eye, through adaptation of the iris and other methods, adjusts constantly to the broad dynamic changes ubiquitous in our environment. The brain continuously interprets this information so that a viewer can see in a wide range of light conditions.

Most image acquisition devices, however, have limited High Dynamic Range (HDR) imaging capabilities. Some cameras are only capable of reproducing or capturing Low Dynamic Range (LDR), resulting in a loss of image accuracy and failure to capture the image as the human eye would see it. For example, traditional photography includes capturing of images in a scene at a single exposure level in the imaging device, resulting in an image with a limited contrast range. The limited contrast (or dynamic) range results in a loss of detail in bright areas of a picture (if the imaging device used one exposure setting) and/or a loss of detail in dark areas (if the imaging device used a different exposure setting). A common example of this effect is a photograph in which the sky appears almost white, while objects on the ground are exposed sufficiently so as to allow details of those objects to be seen. In other words, when taking a picture in the high contrast environment, original colors, original tones, and original details appearing in an actual scene may almost disappear in a high illumination area or a low illumination area.

In an attempt to overcome the disadvantages described above, some image acquisition devices have been designed to capture several frames of the same scene while changing the exposure from frame to frame, then utilizing post-processing techniques to fuse the captured frames together in an attempt to generate an HDR image. However, when the camera, or a subject, or an object of a background is moving during image acquisition, deterioration may be caused by such motion during the HDR fusion process, as the captured frames are different from one another. Thus, a significant problem with conventional methods is the inability to produce HDR images in real, or near-real time, further limiting the ability of image acquisition devices to provide HDR video imaging. Furthermore, current HDR imaging systems may be bulky and thus may not lend themselves for use in smaller, more compact image acquisition devices.

SUMMARY

The present invention provides an optical system configured to provide High Dynamic Range (HDR) image capture and video processing in a mobile device. High Dynamic Range means having a dynamic range greater than the range that can be obtained using a single image sensor, typically 8 bits in depth. In particular, the optical system includes a relatively compact design to provide optimal use in small mobile devices, such as, for example, a mobile phone, a smartphone, a tablet computer, a wearable computer, or a digital mobile camera.

The optical system includes an image capture subsystem configured to capture images via at least two image sensors and an image processing subsystem configured to process image data into HDR video data to be stored or outputted to a display, or other device. The compact design of the optical system is a result of a specific arrangement of components of the image capture subsystem. In particular, the image capture subsystem includes at least two image sensors fixed in a co-planar arrangement to a substrate and an optical splitting module configured to reflect at least about 95% of incident light received through an aperture of a camera of a mobile device onto the image sensors, to thereby capture a high dynamic range image. The optical splitting module includes a beamsplitter specifically configured to transmit a first portion of incident light to a first reflective member and to reflect a second portion of the incident light to a second reflective member, wherein the first and second reflective members transmit at least about 95% of the incident light onto the two image sensors. The beamsplitter is arranged to provide light paths of substantially the same length to the two co-planar image sensors, thereby maintaining co-registration of the image sensors with one another.

The use of two or more image sensors is advantageous in that different light levels for the same image are able to be captured via the two different sensors simultaneously, as opposed to conventional systems which use a single image sensor capturing different levels in a sequential manner. Accordingly, the image data from each of the two image sensors is processed at the same time, thereby resulting in improved HDR image and video processing in real, or near-real, time and can further account for movement from frame to frame. Furthermore, placement of the image sensors along the same plane is advantageous in that the image sensors are co-registered with one another on the same substrate and thus correspondingly move with one another, which improves the durability of the image capture subsystem. For example, during normal use, a camera may move erratically or encounter substantial impacts resulting in movement of internal components of the camera that may affect performance. By placing the image sensors on the same substrate, the image sensors will effectively share the same amount of movement, and thus remain aligned with one another such that performance will remain unaffected. Furthermore, the image capture and image processing subsystems may share the same integrated circuit (IC), thereby further lending to the overall compact design of the system, which can provide substantial savings by reducing manufacturing costs and allowing for relatively simple incorporation into existing mobile devices.

Aspects of the invention include a device for high dynamic range (HDR) image capture. The device includes at least two image sensors fixed in a co-planar arrangement to a substrate and an optical splitting system configured to reflect at least about 90% of incident light received through an aperture of the device onto the image sensors, to thereby capture a high dynamic range image. For example, in some embodiments, greater than about 95% of the incident light received through the aperture of the device is reflected onto the image sensors.

In some embodiments, the optical splitting system includes a beamsplitter configured to transmit a first portion of incident light to a first reflective member and to reflect a second portion of the incident light to a second reflective member, wherein the first and second reflective members reflect at least about 90% of the incident light onto the image sensors.

In some embodiments, the image sensors are configured to detect different portions of a spectrum of visible light. In some embodiments, the first portion of incident light includes about 96% of light entering the aperture of the device and the second portion of incident light includes about 4% of light entering the aperture of the device. The beamsplitter may be positioned so as to transmit 96% of the second portion of incident light from the second reflective member onto the image sensors. In some embodiments, the transmitted second portion includes about 3.84% of light entering the aperture of the device. Each of the first and second reflective members includes a substrate having a reflective coating. In some embodiments, the first and second reflective members are mirrors.

The image sensors are configured to generate image data based, at least in part, on light received from the optical splitting system. The system may further comprise an HDR processing system configured to process the image data from the image sensors so as to generate HDR image and/or video data.

In some embodiments, the image sensors are fixed to a substrate of an integrated circuit (IC). In some embodiments, the image sensors are monolithically formed along a portion of the substrate. The image sensors may be formed from the same material via any known process, including, but not limited to, lithography or etching. In some embodiments, the substrate is bonded to a portion of an integrated circuit (IC). The image sensors may include charge-coupled device (CCD) image sensors or complementary metal-oxide semiconductor (CMOS) image sensors.

In some embodiments, the image sensors and the optical splitting system are integrated into a mobile device. The mobile device may include a handheld computing device including, but not limited to, a mobile phone, a smartphone, a tablet computer, a wearable computer, a digital mobile camera, and a combination of at least two thereof.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

Figure 1:
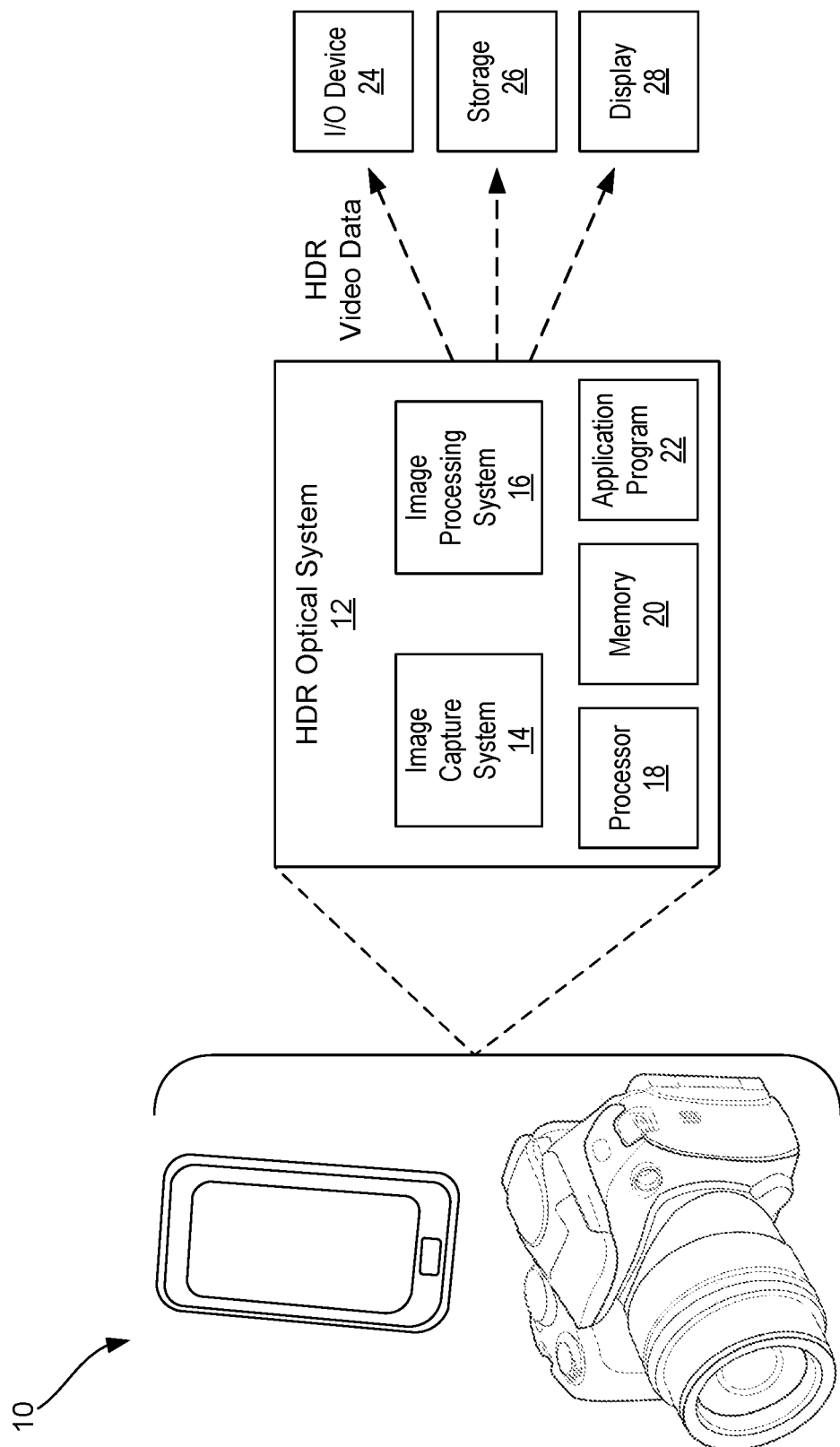
FIG. 1 is a block diagram of a system for providing HDR image capture and video processing for a mobile device consistent with the present disclosure.

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient.

DETAILED DESCRIPTION

By way of overview, the present disclosure generally relates to an optical system configured to provide high dynamic range (HDR) image capture and video processing in a mobile device. The optical system includes an image capture subsystem configured to capture images via at least two image sensors and an image processing subsystem configured to process image data into HDR video data to be stored or outputted to a display, or other device.

The optical system is of a compact design which is optimal for use in small mobile devices, such as, for example, a mobile phone, a smartphone, a tablet computer, a wearable computer, or a digital mobile camera. The compact design is a result of a specific arrangement of components of the image capture subsystem. In particular, the image capture subsystem includes at least two image sensors fixed in a co-planar arrangement to a substrate and an optical splitting module configured to reflect at least about 90% of incident light received through an aperture of a camera of a mobile device onto the image sensors, to thereby capture a high dynamic range image. The beamsplitter is arranged to provide light paths of substantially the same length to the two co-planar image sensors, thereby maintaining co-registration of the image sensors with one another.

The use of two or more image sensors is advantageous in that different light levels for the same image are able to be captured via the two different sensors simultaneously, as opposed to conventional systems which use a single image sensor capturing different levels in a sequential manner. Accordingly, the image data from each of the two image sensors can be processed at the same time, thereby resulting in improved HDR image and video processing in real, or near-real, time and can further account for movement from frame to frame. Furthermore, placement of the image sensors along the same plane is advantageous in that the image sensors are co-registered with one another on the same substrate and thus correspondingly move with one another, which improves the durability of the image capture subsystem. For example, during normal use, a camera may move erratically or encounter substantial impacts that may result in movement of internal components of the camera and may affect performance. By placing the image sensors on the same substrate, the image sensors will effectively share the same amount of movement, and thus remain aligned with one another such that performance will remain unaffected. Furthermore, the image capture and image processing subsystems may share the same integrated circuit (IC), thereby further lending to the overall compact design of the system, which can provide substantial savings by reducing manufacturing costs and allowing for relatively simple incorporation into existing mobile devices.

FIG. 1 is a block diagram of an optical system 12 for providing HDR image capture and video processing for a mobile device 10. As shown, the system 12 may be included within a mobile device 10 having a camera, such as a handheld computing device, which may include, for example, a mobile phone, a smartphone, a tablet computer, a wearable computer, a digital mobile camera. The optical system 12 generally includes an image capture subsystem 14 configured to capture images and an image processing subsystem 16 configured to process image data from the image capture subsystem 14 into HDR image and video data. The optical system 12 further includes one or more processors 18, memory 20, and application programs 22 (software) for collecting and analyzing image data captured by the image capture subsystem 14 for further storing (long-term or temporary) information. Upon processing the image data, the image processing subsystem 16 may further output processed HDR image or video data to an I/O device 24 coupled to the optical system 12, storage 26, or a display 28 (e.g., a viewfinder or display on the mobile device 10, a separate display coupled (via wired or wireless transmission) to the mobile device 10, or the like).

Figure 2:
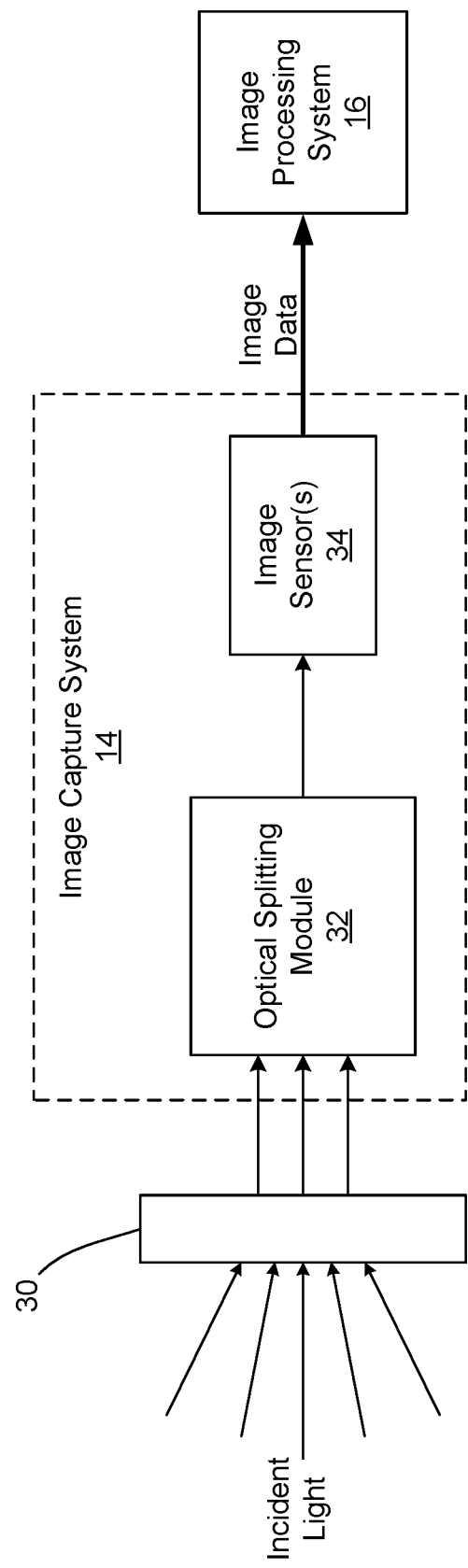
FIG. 2 is a block diagram illustrating the image capture system of FIG. 1 in greater detail.

FIG. 2 is a block diagram illustrating the image capture subsystem 14 of FIG. 1 in greater detail. As shown, the image capture subsystem 14 may generally include an optical splitting module 32 and image sensors 34. The optical splitting module 32 is configured to receive incident light received through an aperture 40 of a camera of the mobile device 10 and providing portions of the incident light to the image sensors 34. The image sensors 34, upon being exposed to portions of the incident light, are configured to provide image data to the image processing subsystem 16 for subsequent processing into HDR image and video data.

Figure 3:
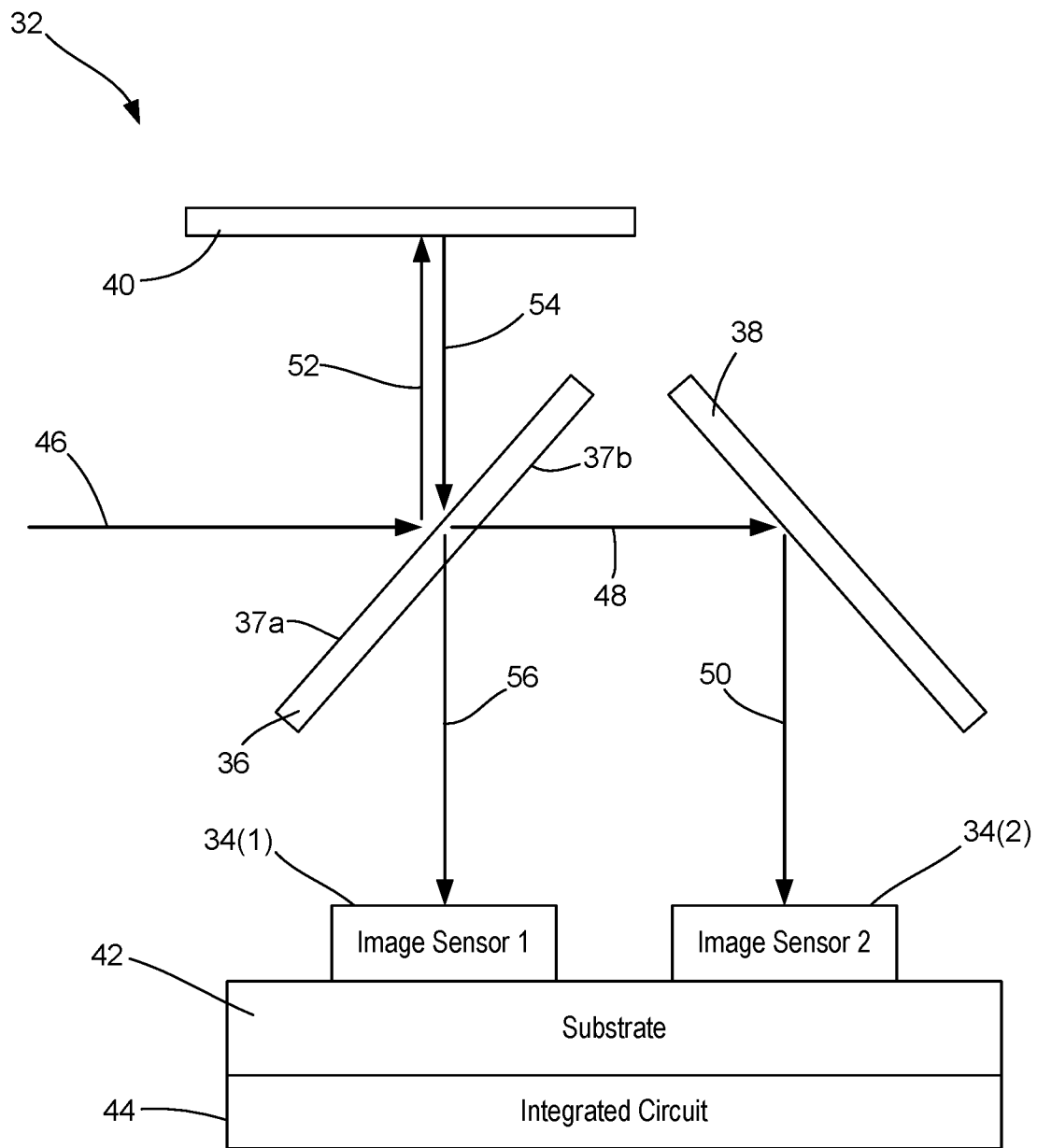
FIG. 3 is a schematic of an embodiment of a beamsplitter for directing incident light towards at least two image sensors fixed in co-planar arrangement.

For example, as shown in FIG. 3, the optical splitting module 32 includes a beamsplitter 36 configured to direct incident light towards at least two image sensors 34(1) and 34(2). Although shown with two image sensors, it should be noted that systems consistent with the present disclosure may include more than two image sensors (i.e., three, four, five, six . . . ten, or more). As used throughout, the term "beamsplitter" generally refers to a partially reflecting optical element that can both transmit and reflect incident light, including but not limited to a partially reflecting mirror, a prism, a pellicle, and/or one or more optical coatings or layers. Accordingly, as shown in FIG. 3, the beamsplitter 36 may be coated on a first surface 37a with a partially-reflecting broadband coating and coated on a second surface 37b with an anti-reflective coating. The optical splitting module 32 further includes first and second reflective members 38, 40 configured to reflect portions of light towards the image sensors 34(1), 34(2), as will be described in greater detail herein. The first and second reflective members 38, 40 may generally be embodied as mirrors or the like.

As shown, the first and second image sensors 34(1) and 34(2) may be fixed in a co-planar arrangement to a substrate 42. In some embodiments, the substrate 42 may be fixed to an integrated circuit (IC) (e.g., by way of monolithic bonding techniques). As will be described in greater detail herein, the first and second image sensors 34(1) and 34(2) may be formed from the same material and on the same substrate, such as monolithically formed along a portion of the substrate 42 (shown in FIGS. 4A and 4B). As used throughout, the term "image sensor" may generally refer to a detector, optical detector, sensor, CMOS sensor, CCD sensor, linear detector array, film, celluloid, or any other optically sensitive medium or device. Accordingly, in embodiments described herein, the first and second image sensors 34(1) and 34(2) may include charge-coupled device (CCD) image sensors or complementary metal-oxide semiconductor (CMOS) image sensors, including an array of light detection elements (e.g., pixels). Upon exposure to the incident light reflected by the optical splitting module 32, the first and second sensors 34(1) and 34(2) are configured to generate image data based, at least in part, on the intensity of light exposed thereto. In turn, the image data is then passed on to the image processing subsystem 16 for processing and conversion into processed HDR image and/or video data.

As shown in FIG. 3, incident light 46 travels along a path towards the beamsplitter 36. The beamsplitter 36 is configured to transmit a first portion of incident light 48 to the first reflective member 38. In turn, the first reflective member 38, by way of a reflective surface, is configured to reflect the first portion of incident light 48 towards at least one of the image sensors (shown as the second image sensor 34(2)), as indicated by pathway 50.

The beamsplitter 36 is further configured to further reflect a second portion of incident light 52 to the second reflective member 40, due to the partially reflective coating on the first surface 37a. The second reflective member 40, by way of a reflective surface, is configured to reflect the second portion of incident light 52 back towards the beamsplitter 36, as indicated by pathway 54. In turn, the beamsplitter 36 transmits the majority of the reflected second portion of incident light (indicated by 54) onto at least one of the image sensors (shown as the first image sensor 34(1)), as indicated by pathway 56.

Accordingly, the beamsplitter 36 of the present invention is configured in such as manner so as to receive light that has initially been reflected therefrom. For example, as previously described herein, the beamsplitter 3 is configured to reflect at least a portion (portion 52) of the incident light 46 to a reflective member (second reflective member 40), which, in turn, reflects that portion of light back towards the beamsplitter 36 to be transmitted through the beamsplitter 36 and onto the image sensors 34(1) and 34(2).

The beamsplitter 36 is configured to reflect and subsequently receive the same portion of light as a result of a low reflectance surface, due, in part, to its use in an HDR capture scheme of the present invention. This configuration would not be possible if the capture scheme included a color separation, or even a 50/50 beamsplitting setup, for example. The beamsplitter 36 may generally include at least a 90% transmittance and a 10% reflectance. Thus, the transmittance of the first portion of incident light 48 through the beamsplitter 36 and subsequent reflection thereof (via the first reflective member 38) may be unhindered, such that an image sensor (sensor 34(2)) may be exposed to the entirety of the first portion of light 48 (e.g., 90% of the total incident light 46). The second portion of incident light 52, when directed back towards and through the beamsplitter 36, may to drop slightly (e.g., second portion of light 52 may drop from 10% to 9% of the total incident light 46), such that an image sensor (sensor 34(1)) may be exposed to almost the entirety of the second portion of light 52. Thus, the configuration of the optical splitting module 32, particularly the design of the beamsplitter 36 relative to the co-planar image sensors 34(1) and 34(2), allows for a majority (e.g., at least 98%) of the incident light 46 received through the aperture 30 of a camera on the mobile device 10 to be provided to the image sensors 34(1) and 34(2).

A 50/50 beamsplitter configuration would not be able to provide such a high percentage of light capture when compared to the design of the present invention. For example, with a 50/50 beamsplitting design, 50% of light would be transmitted while 50% would be reflected, initially. The reflected portion of light, when redirected through back into the beamsplitter, would end up dropping down to about 25% of the total incident light, thereby causing a loss of 25% of the incident light.

The configuration of the optical splitting module 32 of the present invention provides a substantial improvement in light capture in that by directing a reflected portion of light straight back through the beamsplitter, instead of routing the reflected portion of light around the beamsplitter, as provided in some current schemes, the present invention is able to accomplish significant space savings (e.g., a reduction in total optical path length from the imaging lens to the sensor(s)). Accordingly, the system 12 of the present invention is compatible with lenses having lower f-number (greater light gathering capability). Furthermore, the design of the optical splitting module 32 does not require that the initial beam of incident light 46 be "narrow", as is the case with current light capturing systems and designs (e.g., some designs result in routing reflected light around a beamsplitter to be provided towards a sensor). Thus, the system 12 of the present invention does not suffer the restrictions on beam width, which further restricts an imaging lens exit pupil size and location, which current systems face.

Furthermore, the particular configuration of the optical splitting module 32 and co-planar image sensors 34(1) and 34(2) allows for the system 12 of the present invention to be integrated into a mobile device, such as a mobile phone, a smartphone, a tablet computer, a wearable computer, a digital mobile camera, and a combination of at least two thereof. For example, in mobile applications, imaging lenses are often designed with an aperture stop (or pupil) located a relatively far distance from a back side of the lens, such as, at a front side of the lens in order to decrease the required size of the outermost lens element. However, as previously described, current image capturing systems lack sufficient design and are incompatible for mobile use, as current image systems are unable to function in an environment in which the imaging lens' aperture stop is located at a front side of the lens. The particular configuration of the optical splitting module 32 and co-planar image sensors 34(1) and 34(2) allows for the system 12 to function in such an arrangement and thus allows for the system 12 to be more compatible with smaller system applications, such as imaging in mobile device cameras.

As previously described, the first and second portions of incident light 48 and 52 may have different levels of intensity. For example, in some embodiments, the first portion 48 may include 96% of the incident light 46, while the second portion 52 may include approximately 4% of the incident light 46. The reflection of the first portion of incident light may be unhindered, such that the second image sensor 34(2) may be exposed to 96% of the incident light. Due to transmission via the beamsplitter 36, the transmitted second portion of incident light exposed to the first image sensor 34(1) may be slightly less than 4% (e.g., it may be 96% of the original 4%, or 3.84%). Thus, in total, greater than about 99% of the incident light 46 received through the aperture 30 of a camera on the mobile device 10 is reflected onto the image sensors 34(1) and 34(2). Note that reflectance values of mirrors such as reflective members 38, 40 may be less than 100%, which may cause the total light reflected onto the image sensors 34(1) and 34(2) to decrease from the 99% value in the present example. It should be noted that the beamsplitter 36 is configured to be tuned, or otherwise replaced with a beamsplitter having different transmittance/reflectance properties, so as to adjust the portions of light to be initially transmitted and reflected. For example, the beamsplitter may transmit 90% of incident light towards the first reflector 38 and reflect 10% of incident light towards the second reflector 40.

Because the first and second image sensors 34(1) and 34(2) are fixed in co-planar arrangement, both are configured to receive substantially the same amount of light exposure time, but at different intensities. For example, due to the arrangement of the beamsplitter 36 and the first and second reflector members 38, 40, the image sensor 34(1) is exposed to the second portion of incident light, which generally includes about 3.84% of the incident light, while image sensor 34(2) is exposed to the first portion of incident light, which is about 96% of the incident light. Thus, image sensors 34(1) and 34(2) are configured to simultaneously capture substantially identical images with substantially different light levels. The particular arrangement of the beamsplitter 36 and first and second reflective members 38 and 40 provides for pathways 50 and 56 of incident light to have substantially the same length, thereby maintaining equal focus of the image sensors 34(1), 34(2) with one another. Equal focus is critical for a number of reasons. For example, by maintaining the same lengths of light beams received by each of the image sensors 34(1) and 34(2), image data captured by the image sensors 34(1), 34(2) is spatially and temporally identical in structure, as the only difference between image data for each image sensor 34(1), 34(2) is the light intensity.

Accordingly, the image data from each of the image sensors 34(1) and 34(2) can then be transmitted to the image processing subsystem to be processed at the same time. By processing image data concurrently, as opposed to in a serial fashion, the present system allows for improved HDR image and video processing in real, or near-real, time because each set of image data from the image sensors is identical, but for the associated levels of light intensity. Thus, because each set includes image data with relatively high light level (e.g., 96% from image sensor 34(2)) and image data with relatively low light level (e.g., 3.84% from image sensor 34(1)), processing can be performed immediately during the capture of a single frame. This is much improved over some current systems that rely on a single image sensor for capturing single frames at the different light intensities in an alternating fashion (e.g., capture frame with high light level, then capture frame with low light level, then capture frame with high light level, etc.), where processing cannot occur until at least two different frames have been captured.

Figure 4A:
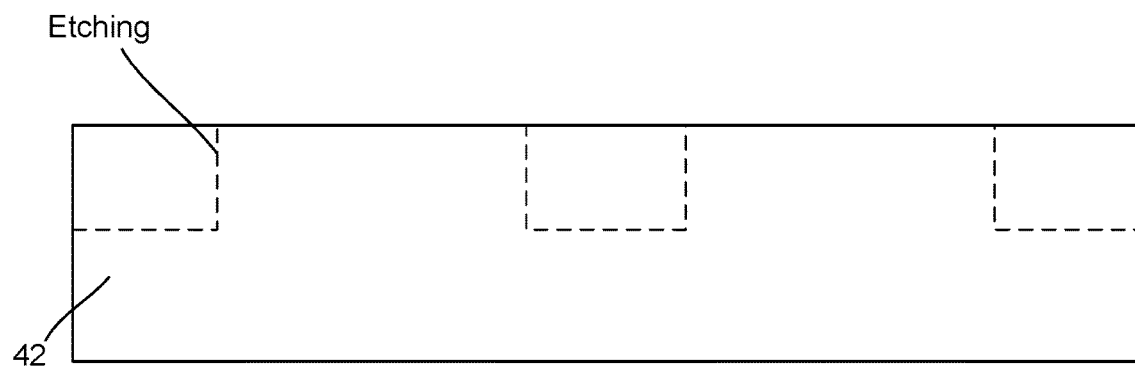
FIGS. 4A and 4B are sectional views of a substrate illustrating a process of monolithically forming the image sensors into a surface of the substrate.
Figure 4B:
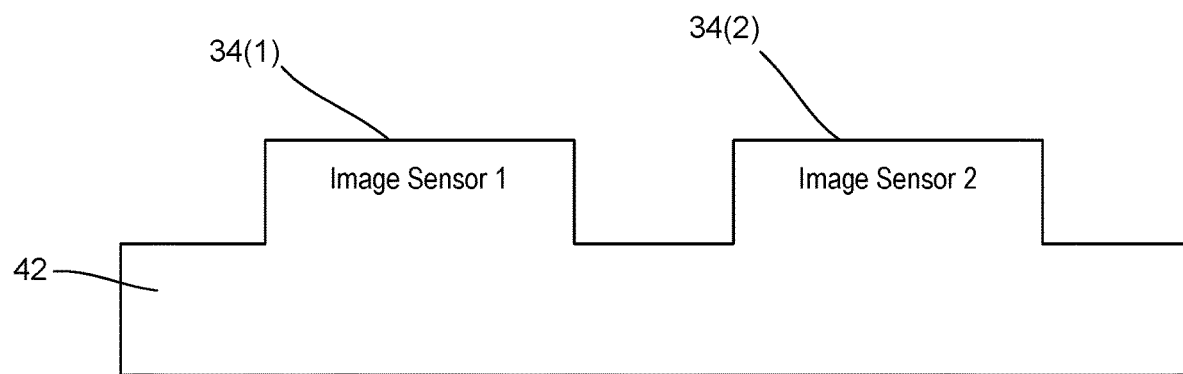

FIGS. 4A and 4B are sectional views of a substrate 42 illustrating a process of forming the image sensors 34(1) and 34(2) into a surface of the substrate 42. As previously described, the image sensors 34(1) and 34(2) may be fixed in co-planar arrangement on the substrate 42. In some embodiments, the image sensors may be formed on the substrate via any known technique. For example, in the event that the image sensors are complementary metal-oxide semiconductor (CMOS) devices, the image sensors may be formed by any known additive process, etching, or lithography technique, in which the image sensors are monolithically formed as part of the substrate 42. Forming the image sensors as part of the substrate allows for accurate placement of the image sensors in co-planar arrangement with one another.

Placement of the image sensors along the same plane on the substrate is advantageous in that the image sensors are co-registered with one another on the same substrate and thus correspondingly move with one another, which improves the durability of the image capture subsystem. For example, during normal use, a camera may move erratically or encounter substantial impacts (e.g., dropping smartphone on ground, impact between mobile camera and objects during sports activities or the like, which such movement or impact result in movement of internal components of the camera and may affect performance. By placing the image sensors on the same substrate, the image sensors will effectively share the same amount of movement, and thus remain aligned with one another such that performance will remain unaffected.

The substrate 42 may further be bonded to an IC, for example, upon which one or more other components of the optical system 12 may be placed. For example, in some embodiments, both the image capture and image processing subsystems 14 and 16 may share the same integrated circuit (IC), thereby further lending to the overall compact design of the system, which can provide substantial savings by reducing manufacturing costs and allowing for relatively simple incorporation into existing mobile devices.

Figure 5:
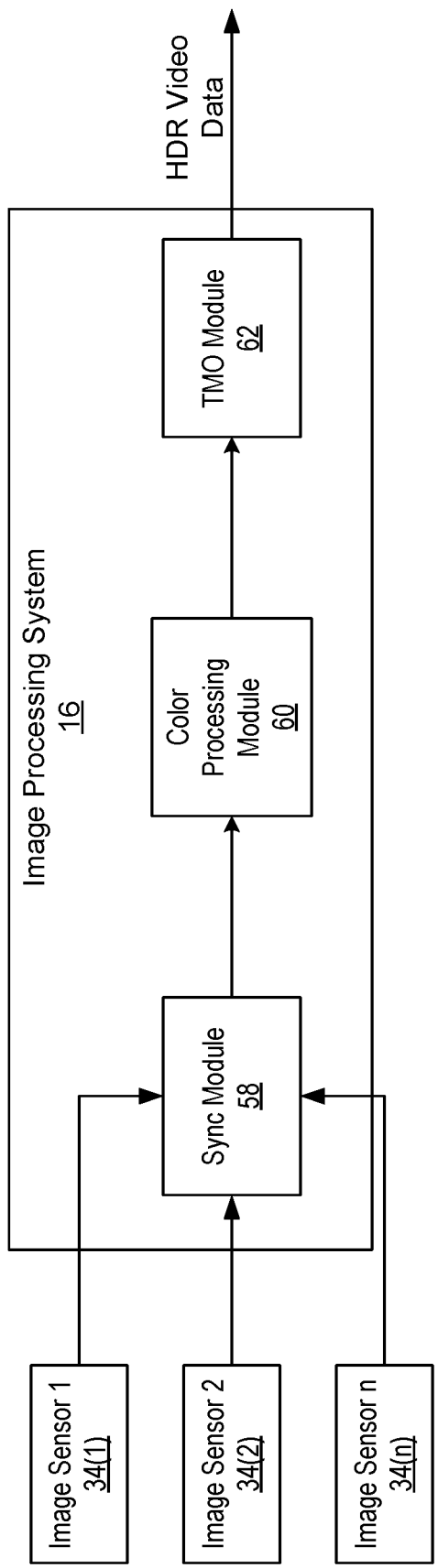
FIG. 5 is a block diagram illustrating the image processing subsystem in greater detail, including the flow of image data from the image capture subsystem to the image processing subsystem.

FIG. 5 is a block diagram illustrating the image processing subsystem 16 in greater detail, including the flow of image data from the image capture subsystem 14 to the image processing subsystem 16. As shown, the image processing subsystem 16 may be configured to receive image data from a plurality of image sensors 34(1)-34(n). The image processing subsystem 16 may include components configured to provide processing and compression techniques on the image data (e.g., HDR merging, H.264 or JPEG compression, tonemapping, residual HDR pixel values, etc.) so as to generate HDR video data. In this example, image data from the image sensors 34(1)-34(n) is transmitted to a sync module 58. The image data may include information related to the captured image and light intensity, such as values of pixels from one or more pixels indicative of a detected color intensity. The synch module 58 is configured to synchronize the pixel signals with one another, at which point the pixel signals may then be sent to a color processing module 60. The color processing module 60 may include one or more submodules configured to perform additional processing steps, including, but not limited to, a linearization module, color match module that executes a color matching process, a color correction module that executes a color correction process. The purpose of a color matching process is to merge images from multiple sensors together, in stages where two images are merged at a time, in a way that preserves color information from one sensor to the next, including components and processes discussed in Application Ser. No. 62/294,820, filed Feb. 12, 2016, the contents of which are incorporated by reference herein in their entirety. The color corrected information can then optionally undergo additional processing by, for example, a tone mapping operator (TMO) module 62, at which point, HDR video data can then transmitted to an I/O device 24, storage 26, and/or a display 28.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry.

Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A device for high dynamic range (HDR) image capture, the device comprising:
at least first and second co-planar image sensors fixed in a co-planar arrangement to a substrate;
an optical splitting system configured to (i) transmit at least about 90% of incoming light received through an aperture of said device along a first path that gets reflected onto the first image sensor, and (ii) reflect a remainder of the incoming light along a second path onto the second image sensor, wherein the first and second paths have substantially the same length whereby the first and the second image sensors simultaneously capture images that are identical but at different light levels and wherein the first and the second image sensors receive at least about 95% of the incoming light; and
a high dynamic range image (HDR) processing system operable to process the images to form an HDR image.

2. The device of claim 1, wherein said optical splitting system comprises a beamsplitter configured to transmit a first portion of the incoming light along the first path to a first reflective member and to reflect a second portion of the incoming light along the second path to a second reflective member, wherein said first and second reflective members reflect incident light onto said first and second image sensors.

3. The device of claim 2, wherein said first portion of incident light comprises about 96% of light entering said aperture of said device.

4. The device of claim 2, wherein said second portion of incident light comprises about 4% of light entering said aperture of said device.

5. The device of claim 2, wherein each of said first and second reflective members comprises a substrate having a reflective coating.

6. The device of claim 5, wherein said first and second reflective members are mirrors.

7. The device of claim 1, wherein greater than about 99% of said incident light received through said aperture of said device is reflected onto said image sensors.

8. The device of claim 1, wherein said image sensors are configured to generate image data based, at least in part, on light received from said optical splitting system.

9. The device of claim 1, wherein said image sensors are fixed to a substrate of an integrated circuit.

10. The device of claim 1, wherein said image sensors are monolithically formed along a portion of said substrate.

11. The device of claim 10, wherein said substrate is bonded to a portion of an integrated circuit.

12. The device of claim 1, wherein said image sensors are charge-coupled device (CCD) image sensors or complementary metal-oxide semiconductor (CMOS) image sensors.

13. The device of claim 1, said image sensors and said optical splitting system are integrated into a mobile device having a camera.

14. The device of claim 13, wherein said mobile device comprises a handheld computing device selected from the group consisting of a mobile phone, a smartphone, a tablet computer, a wearable computer, a digital mobile camera, and a combination of at least two thereof.

15. A device for high dynamic range (HDR) image capture, the device comprising:
at least two image sensors fixed in a co-planar arrangement to a substrate; and
an optical splitting system configured to reflect at least about 90% of incident light received through an aperture of said device onto said image sensors, to thereby capture a high dynamic range image, said optical splitting system comprises an asymmetric beamsplitter configured to reflect at least a portion of said incident light to a reflective member configured to reflect said portion of incident light back towards said beamsplitter to be transmitted through said beamsplitter and onto said image sensors, whereby said image sensors simultaneously capture images that are identical but at different light levels.

16. A device for high dynamic range (HDR) image capture, the device comprising:
at least two image sensors fixed in a co-planar arrangement to a substrate; and
an optical splitting system configured to reflect at least about 90% of incident light received through an aperture of said device onto said image sensors, to thereby capture a high dynamic range image, said optical splitting system comprises an asymmetric beamsplitter configured to transmit a first portion of said incident light to a first reflective member for reflecting said first portion of said incident light onto said image sensors and further configured to reflect a second portion of said incident light to a second reflective member for reflecting said second portion of said incident light back to said beamsplitter and transmitted therethrough and onto said image sensors, whereby said image sensors simultaneously capture images that are identical but at different light levels.

* * * * *